R. A. MAUGER.
WATER GAGE.
APPLICATION FILED MAR. 27, 1911.
1,036,289.  Patented Aug. 20, 1912.
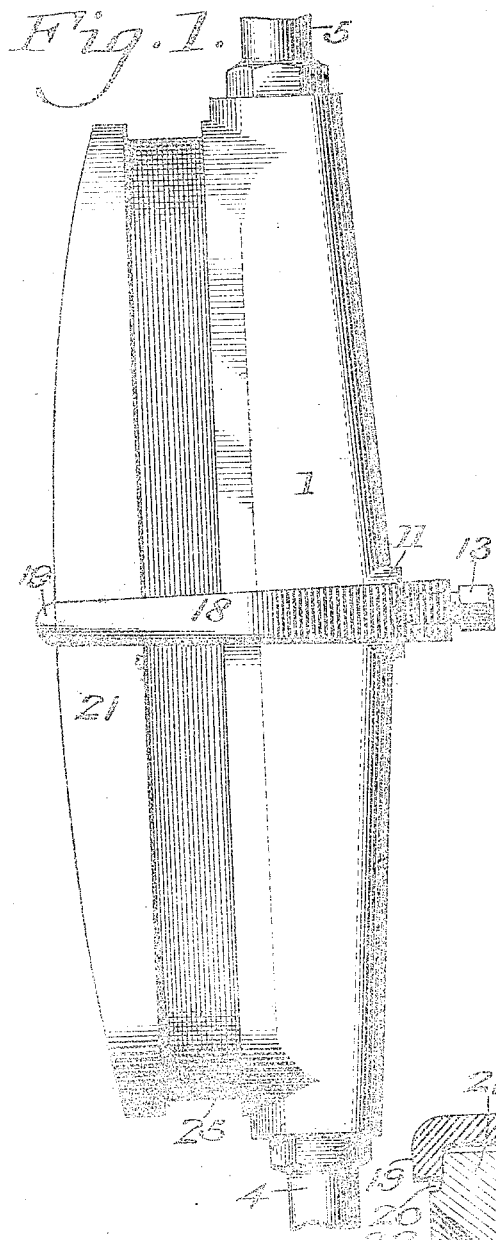
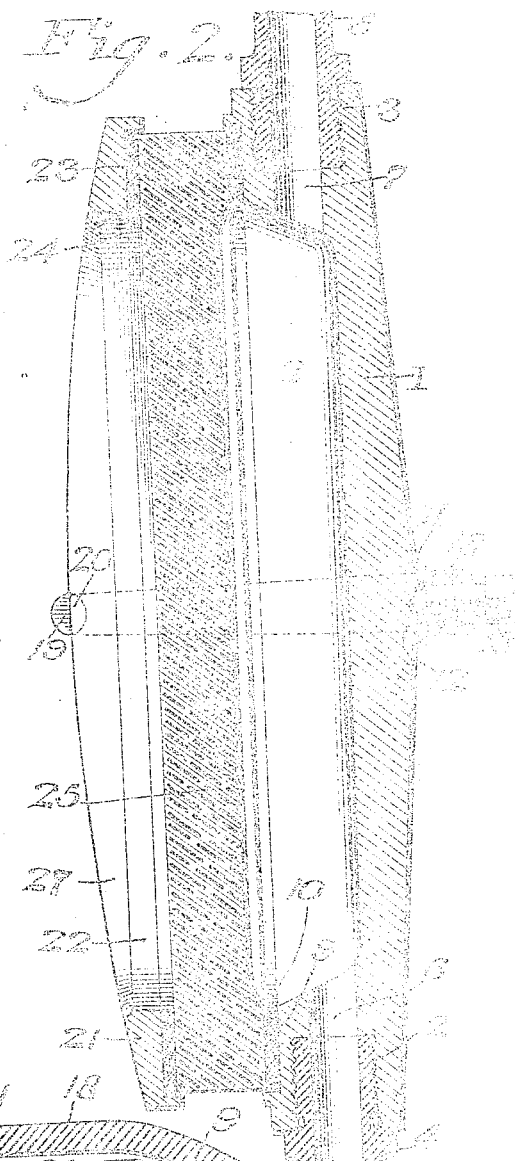
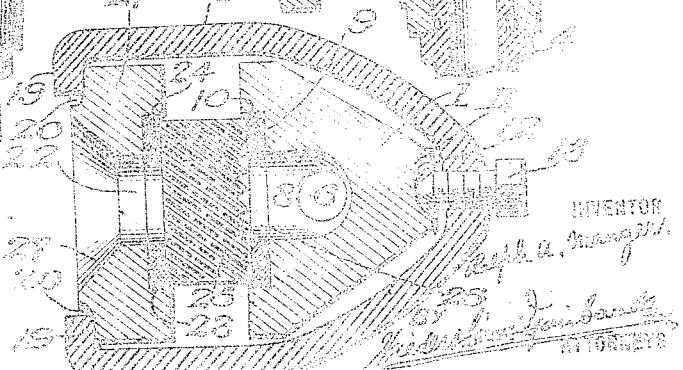

UNITED STATES PATENT OFFICE.

RALPH A. MAUGER, OF CAMDEN, NEW JERSEY, ASSIGNOR OF ONE-HALF TO EDWIN MACNEIR, OF PHILADELPHIA, PENNSYLVANIA.

WATER-GAGE.

1,036,289.  Specification of Letters Patent.  Patented Aug. 20, 1912.

Application filed March 27, 1911. Serial No. 617,127.

*To all whom it may concern:*

Be it known that I, RALPH A. MAUGER, a citizen of the United States, residing in the city and county of Camden, State of New Jersey, have invented a new and useful Water-Gage, of which the following is a specification.

In water gages as heretofore constructed, considerable difficulty and expense in maintenance has arisen owing to the likelihood of the glass becoming broken when the same is adjusted to overcome leakage at different points along the glass, since such adjustment places non-uniform pressure upon the glass so that breakage of glasses occurs owing to such adjustment and to the expansion and the contraction of the glass itself.

In my present invention, I have designed a novel construction of a water gage which overcomes the above objections present in prior devices of this character and in which the likelihood of the glass becoming broken during the adjustment of the same with respect to the gage frame to overcome leakage is positively prevented.

With the above and other objects in view which will be understood from the detailed description, my present invention consists of a novel construction of a water gage comprising a novel construction of a gage frame, a novel construction of a sight opening member, and novel means for securing the glass in assembled position between the gage frame proper and the sight member.

It further consists of a novel construction of water gage wherein longitudinal movement of the glass is permitted without affecting the sealed condition of the water gage.

It further consists of other novel features of construction all as will be hereinafter set forth.

For the purpose of illustrating my invention I have shown herein one embodiment thereof which is at present preferred by me since I have found that under practical working conditions the same gives very advantageous and reliable results although it is to be understood that the various instrumentalities of which my invention consists can be variously arranged and organized and that my invention is not limited to the exact organization of these instrumentalities as herein set forth.

Figure 1 represents a side elevation of a water gage, embodying my invention. Fig. 2 represents a sectional elevation of Fig. 1. Fig. 3 represents a transverse section of my novel water gage.

Similar numerals of reference indicate corresponding parts in the figures.

Referring to the drawings:—1 designates the casing of my novel water gage, the same having at opposite ends the threaded openings 2 and 3, adapted to receive the threaded connections 4 and 5 which form a fluid tight, seal with the casing 1 and communicate by means of the passages 6 and 7 respectively with the inner chambered portion 8 of the casing 1. The forward face of the casing 1 is provided with a recess 9 adapted to receive packing material 10 of any desired or conventional type. The rear wall of the casing is preferably thicker at its central portion as is indicated at 11 and is provided with a recess 12, providing a bearing for the inner end of the set screw 13 which has threaded engagement with a yoke or clamp 18. The forward ends of the yoke 18 are inwardly and laterally deflected as is indicated at 19 and such inward extensions are preferably rounded in order that a pivotal connection or its equivalent will be formed by the coaction of said extensions 19 with the recesses 20 located preferably centrally on the sight member 21, which latter is provided with a sight opening 22 having outwardly curved or inclined walls 27. The inner face of the sight member 21 is provided with a recess 23 surrounding the sight opening 22 and adapted to receive packing material 24 of any desired nature.

25 is the gage glass, the rear face of which is preferably provided with grooves or slots 26, of the usual construction. The manner of assembling my device will now be readily apparent to those skilled in this art, and is as follows: The packing 10 is placed within the recess 9, and the packing 24 is placed in the recess 23, the glass 25 is then placed in position relatively to the packings 10 and 24 and the yoke or clamp 18 is slipped over the casing 1 and the side member 21 so that the extensions 19 thereof will be seated in the recesses 20 and the adjusting screw 13 will engage in the recess 12. When the adjusting screw 13 is tightened, the yoke or clamp 18 will draw the glass 25 toward the packing 10 so that the glass will be secured in fluid tight condition relatively to the casing 1 and the sight member 21.

Special attention is directed to the fact that the means employed for securing the parts in assembled condition comprises only a three-point contact consisting of the extensions 19, of the yoke or clamp 18, engaging in the recesses 20, and adjusting screw 13 engaging in the recess 12, it being seen that the forward end of the screw 13 is preferably rounded or of conical formation to coact with the bottom of the recess 12.

The point of the screw 13 will automatically center itself in the recess 12 as is apparent.

It will be apparent that owing to the novel manner in which the glass is secured in assembled position with respect to the casing and the sight member that longitudinal movement of the glass will be permitted so that the glass will seat upon the gasket and a fluid tight seal will be formed with the casing.

My novel device may be very economically manufactured and the number of parts employed has been reduced to a minimum and the construction is such that the same may be readily adjusted by any workman and does not require the services of a skilled mechanic to secure the parts in their proper assembled position or to adjust a new gage glass. If leakage occurs at any point along the glass it is simply necessary to adjust the set screw 13 whereupon the glass will be drawn into proper engagement with the packings 10 and 24 without distorting the glass or placing a non-uniform pressure thereon at different points.

The yoke or clamp 18 is illustrated in the present instance as comprising a device which I have preferred to illustrate as consisting of a part having the general contour of a C clamp having two points of contact and adapted to carry the set screw which forms the other point of contact.

It will now be apparent that I have devised a novel and useful water gage which embodies the features of advantage enumerated as desirable in the statement of invention and the foregoing description, and while I have in the present instance illustrated and described a preferred embodiment thereof which in practice will give satisfactory and reliable results it is to be understood that the same is susceptible of modifications in various particulars without departing from the principle or scope of my invention or sacrificing any of its advantages.

Having thus described my invention, what I claim as new and desire to secure by Letters Patent, is:—

1. The combination in a water gage, of a casing having an open side, a glass, a gasket between the casing and the glass, a sight member having an opening therethrough and provided with recesses, a gasket between said sight member and glass, a yoke located centrally between the ends of said casing and having lateral extensions to seat in said recesses, and an adjustable screw in engagement with said yoke and having one end contacting with the casing.

2. In a water gage, a casing having an open side, a gasket surrounding said open side, a glass engaging said gasket, a gasket on the outer face of said glass, an apertured sight member engaging said last named gasket and having recesses in its front face, a yoke having extensions engaging said recesses, and a screw carried by said yoke and contacting with the rear wall of said casing.

3. In a water gage, a casing having an open side, packing material surrounding the open side, a glass engaging the packing material, a member on the opposite side of the glass having a sight opening forming the sight portion of the gage, a yoke each arm of which is provided at its extremity with a lug projecting toward the other arm and forming a shoulder or bearing surface, said yoke being placed about the structure formed by the other elements named, with its shoulders engaging corresponding surfaces of the member having the sight opening, and means co-acting with the yoke and casing to maintain the glass, packing and casing in sealed condition.

4. In a water gage, a casing having an open side, packing material surrounding the open side, a glass engaging the packing material, a member on the opposite side of the glass having a sight opening forming the sight portion of the gage, a yoke each arm of which is provided at its extremity with a lug projecting toward the other arm and forming a shoulder or bearing surface at an angle of not greater than 90 degrees to the body portion of the arm, said yoke being placed about the structure formed by the other elements named, with its shoulders engaging corresponding surfaces of the member having the sight opening, and means co-acting with the yoke and casing to maintain the glass, packing and casing in sealed condition.

5. In a water gage, a casing having an open side, a glass closing said open side, an apertured sight member for said glass, a packing between said casing and said glass, a packing between said glass and said sight member, a yoke embracing the casing, the glass and the sight member and having its forward ends engaging the sight member, said sight member having means for fixing the position of the ends of the yoke with reference to the sight member, and an adjustable fastening device co-acting with said yoke and said casing.

6. In a water gage, a casing having an open side and apertured extensions, a gasket surrounding said open side, a glass engaging said gasket, an apertured sight member exterior of said glass, a yoke extending around the rear and adjacent sides of said casing and having lateral extensions forming a two point contact with the front face of the sight member, said sight member having means for fixing the position of the ends of the yoke with respect to the sight member, and an adjustable fastening device carried by said yoke and engaging the rear face of the casing whereby the sight member is free to adjust itself longitudinally with respect to the glass when the said fastening device is actuated.

RALPH A. MAUGER.

Witnesses:
 EDWIN MACNEIR,
 C. D. McVAY.